United States Patent Office 3,243,864
Patented Apr. 5, 1966

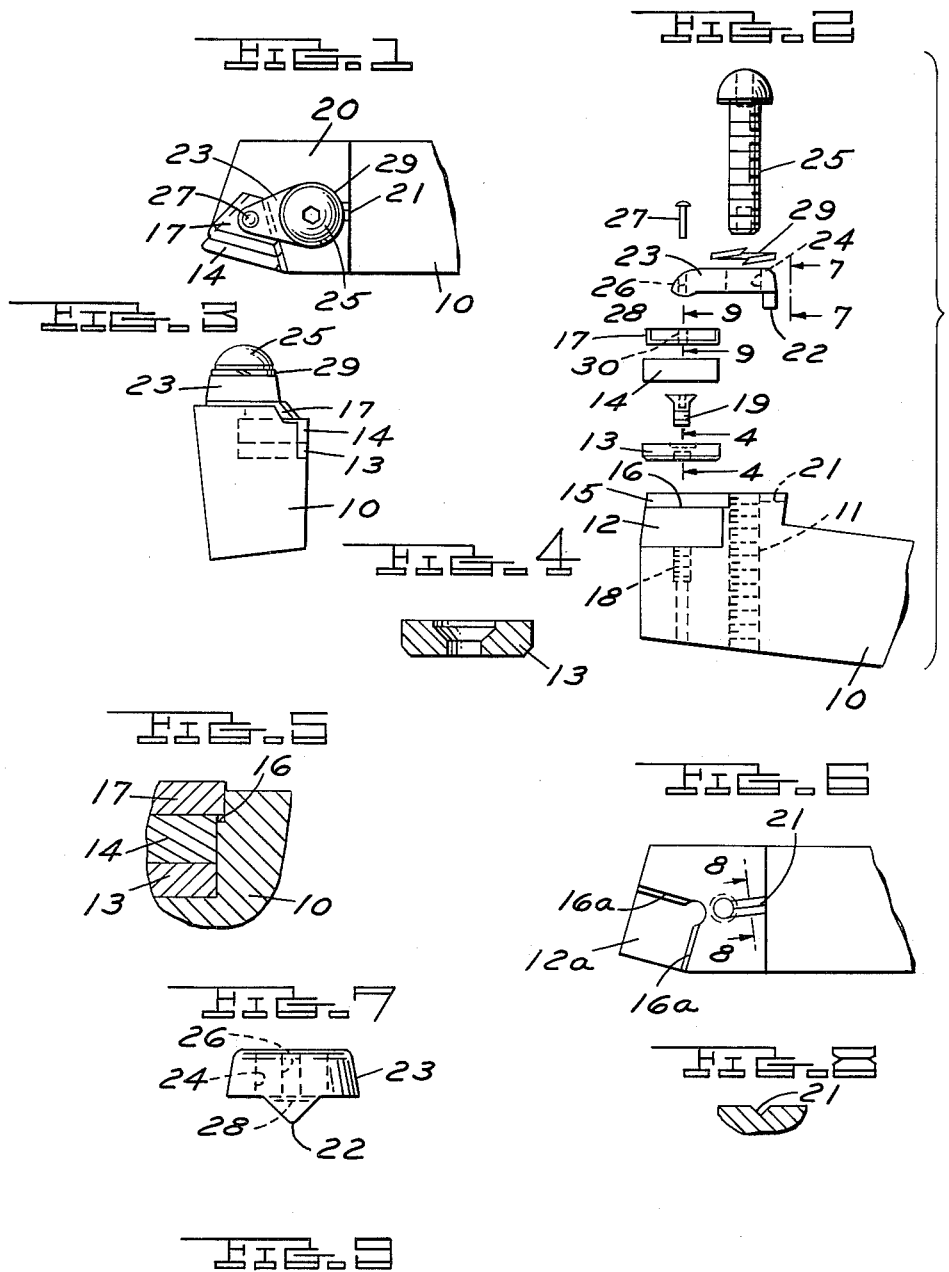

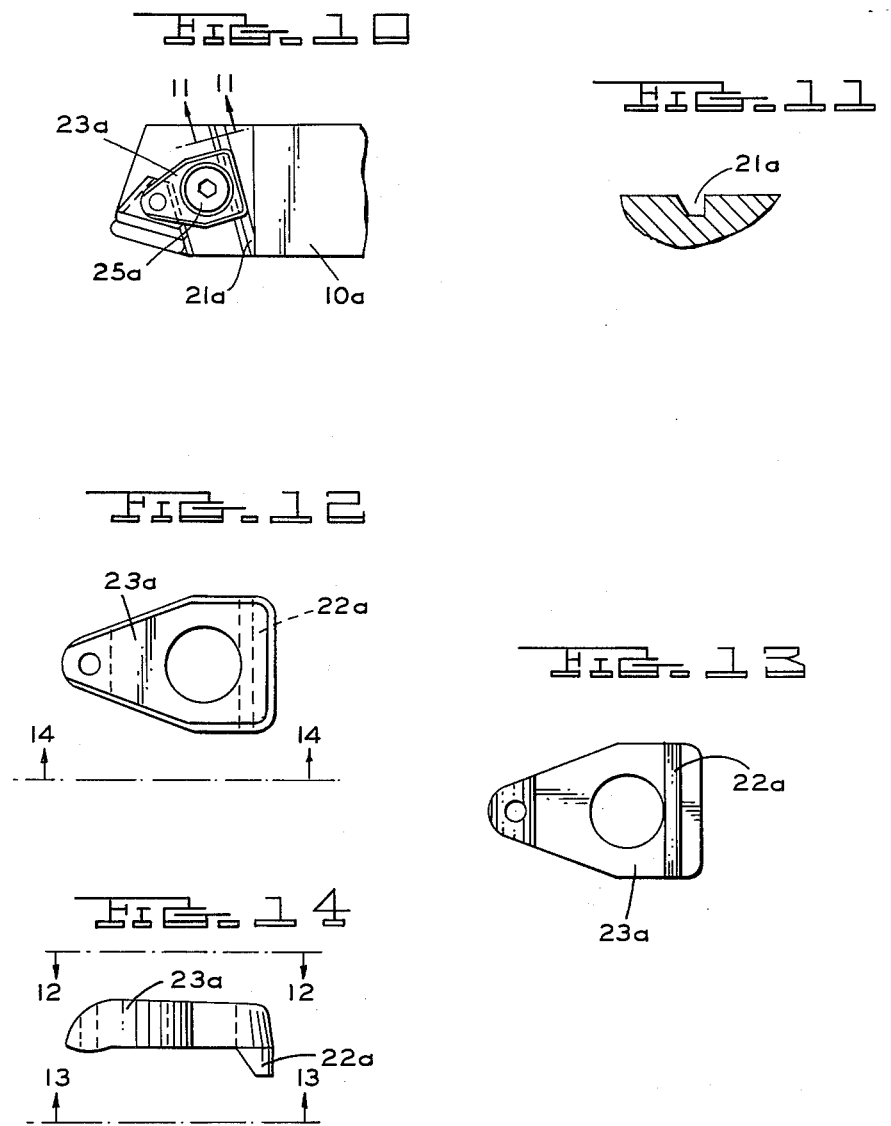

3,243,864
INDEXABLE CUTTING TOOL HOLDER
William Yogus, Birmingham, Mich., assignor to The Valeron Corporation, Detroit, Mich., a corporation of Michigan
Filed Dec. 29, 1964, Ser. No. 425,667
5 Claims. (Cl. 29—96)

This invention is a continuation-in-part of pending application Serial No. 349,208 filed on March 4, 1964, to become abandoned upon the filing of the present application.

This invention relates to a cutting tool holder and more particularly to a holder for removably clamping an indexable cutting insert of the general type disclosed in prior Patent 2,799,079. In a tool holder construction of this type where a chipbreaker is employed between the clamping element and the cutting insert per se, it is desirable to provide means for retaining the chipbreaker and clamping element upon loosening to facilitate indexing of the cutting insert.

The present improvement employs a spring washer between the clamp and locking screw to maintain a limited amount of pressure on the chipbreaker and cutting insert when the locking screw is loosened avoiding accidental dislocation and dropping of the cutting insert regardless of the angle at which the cutting tool is disposed. In addition, a ledge is provided for the chipbreaker to engage when the cutting insert is removed to facilitate re-insertion of the cutting insert. With such ledge the chipbreaker may be loosely pinned to the clamping head and retained under the tension of the spring washer against displacement or disorientation throughout the indexing of the cutting insert.

These and other objects of the present improvement will be more apparent from the following detailed description of a preferred embodiment and modification thereof as illustrated in the drawings wherein:

FIG. 1 is a plan view of a cutting tool holder incorporating the improvements of the present invention;

FIG. 2 is a side elevation of the holder showing the various elements in exploded relation;

FIG. 3 is an end elevation of the holder shown in FIG. 1;

FIG. 4 is an enlarged sectional view of the shim seat taken along the line 4—4 of FIG. 2;

FIG. 5 is an enlarged fragmentary sectional view of the assembled chipbreaker insert and shim seat showing the ledge for the chipbreaker;

FIG. 6 is a view similar to FIG. 1 of the holder per se modified for a square insert;

FIG. 7 is an end view of the clamp element taken along the line 7—7 of FIG. 2;

FIG. 8 is a fragmentary sectional view taken along the line 8—8 of FIG. 6 showing a V-groove in the holder;

FIG. 9 is a sectional view of the chipbreaker per se taken along the line 9—9 of FIG. 2;

FIG. 10 is a plan view similar to FIG. 1 showing a modification forming the novel subject matter of the present continuation-in-part application;

FIG. 11 is a fragmentary sectional view taken along the line 11—11 of FIG. 10;

FIG. 12 is an enlarged plan view of the clamping element per se shown in FIG. 10 taken along the line 12—12 of FIG. 14;

FIG. 13 is a view of the underside of said clamping element taken along the line 13—13 of FIG. 14; and FIG. 14 is a side elevation of such clamping element taken along the line 14—14 of FIG. 12.

With reference to FIG. 2 the tool holder assembly, which in the present illustration comprises a turning tool, includes a holder 10 having a threaded clamp screw hole 11, a pocket 12 for a shim seat 13 and cutting insert 14, a slightly enlarged pocket 15 having a ledge 16 for chipbreaker 17 and a threaded screw hole 18 for shim seat screw 19. The upper face 20 of the holder includes a V-groove 21 for receiving a V projection 22 of a clamp element 23 which is provided with a through hole 24 for a clamp screw 25 and a through hole 26 for a chipbreaker pin 27, the lower end 28 of the clamp element being somewhat rounded to assure central pressure engagement. A spring washer 29 is employed between the head of the clamp screw 25 and the clamp 23 which maintains the various elements under spring tension when the screw is loosened.

As best shown in FIG. 5 when these elements are in assembled position the cutting insert 14 extends slightly above the ledge 16 which is engaged by the chipbreaker 17 when the cutting insert is removed. With this construction the pin 27 may have a free slip-fit relation with both the hole 26 in the clamp 23 and the hole 30 and the chipbreaker 17 permitting a limited angular play therebetween to assure proper seating of the chipbreaker on the upper surface of the cutting element 14. Engagement of the V projection 22 of the clamp 23 in the V-groove 21 in the upper face 20 of the holder prevents rotation of the clamp element 23 when the lock screw is loosened. This, together with the spring tension of the spring washer 29, urging the clamp end 28 downwardly against the chipbreaker 17 and the latter against the ledge 16 when the cutting element 14 is removed for indexing or replacement, maintains the entire clamping assembly in proper orientation during removal and replacement of the cutting element.

As shown in FIG. 6 this construction may readily be modified through the provision of a square pocket 12a to hold a square insert in place of the triangular insert shown in FIG. 1, in which case a square chipbreaker would be employed to engage the ledges 16a when the cutting element is removed.

Referring to FIGS. 10–14 the modified clamping element 23a is provided with a relatively wide projection 23a for engaging the matching V-groove 21a in the holder 10a providing a superior control on the angular position of the clamp element during loosening and re-tightening the nut, relative to the corresponding V projection 22 of the first embodiment, due to the greater effective distance of the modified V projection from the pivotal axis of the clamp element. This has been found to be an important improvement, particularly in turning tools facing the opposite direction from the tool shown in the drawing where the right hand tightening of clamp screw 25 may tend to urge the cutting element away from its corner pocket in the event of any rotational play in the clamp element 23. Such problem has been found to be entirely overcome by the modified clamp element shown in FIGS. 10–14 where the more positive control of the clamp angle completely avoids any shifting thereof during the tightening operation.

While a particular preferred embodiment and modifications thereof have been illustrated and described above in detail it will be understood that further modifications might be resorted to without departing from the scope of the invention as defined in the following claims.

I claim:
1. A tool holder assembly for an indexable cutting element comprising a holder body having a pocket recess with at least two sidewalls for holding an indexable cutting insert, a cutting insert engaging and extending slightly above said sidewalls, a slightly enlarged chipbreaker pocket in said holder body adjacent said cutting element pocket having terminal ledges extending slightly below the adjacent surface of said cutting insert when in operating position, a chipbreaker normally engaging said adjacent surface and adapted to engage said ledges when the cutting element is removed, and a clamping element adapted to engage said chipbreaker in holding said cutting element in operating position.

2. A tool holder assembly as set forth in claim 1 including an actuating screw for locking said clamping element against said chipbreaker and cutting insert thereunder, and spring means interposed between said locking screw and clamp element to maintain resilient pressure of said clamp element against said chipbreaker and cutting insert upon loosening said screw.

3. A tool holder assembly as set forth in claim 1 including an actuating screw for locking said clamping element against said chipbreaker and cutting insert thereunder, spring means interposed between said locking screw and clamp element to maintain resilient pressure of said clamp element against said chipbreaker and cutting insert upon loosening said screw, and a loosely fitting pin engaging aligned apertures through said clamp element and said chipbreaker.

4. A tool holder assembly as set forth in claim 1 including an actuating screw for locking said clamping element against said chipbreaker and cutting insert thereunder, spring means interposed between said locking screw and clamp element to maintain resilient pressure of said clamp element against said chipbreaker and cutting insert upon loosening said screw, and a loosely fitting pin engaging aligned apertures through said clamp element and said chipbreaker, said holder body having a V-groove in a clamp engaging surface thereof, said clamp element having a V projection engaging said groove to prevent displacement of said clamp element upon the loosening of said locking screw.

5. A tool holder assembly as set forth in claim 4 wherein said V-groove in said holder body extends transversely across the end thereof, and wherein said V projection of said clamp element has a substantial width extending away from the pivotal axis of said clamping element established by said actuating screw in a manner adapted to avoid pivotal shifting of said clamping element upon tightening said actuating screw.

No references cited.

WILLIAM W. DYER, JR., *Primary Examiner.*

HARRISON HINSON, *Examiner.*